March 3, 1959 R. W. MURPHY 2,875,537
MAGNETIC DISPLAY DEVICE
Filed June 25, 1958 7 Sheets-Sheet 1

INVENTOR
ROBERT W. MURPHY
BY Harry T. Berriman
AGENT

March 3, 1959 R. W. MURPHY 2,875,537

MAGNETIC DISPLAY DEVICE

Filed June 25, 1958 7 Sheets-Sheet 3

March 3, 1959 R. W. MURPHY 2,875,537

MAGNETIC DISPLAY DEVICE

Filed June 25, 1958 7 Sheets-Sheet 4

March 3, 1959 R. W. MURPHY 2,875,537

MAGNETIC DISPLAY DEVICE

Filed June 25, 1958 7 Sheets-Sheet 6

March 3, 1959 R. W. MURPHY 2,875,537

MAGNETIC DISPLAY DEVICE

Filed June 25, 1958 7 Sheets-Sheet 7

2,875,537
Patented Mar. 3, 1959

2,875,537

MAGNETIC DISPLAY DEVICE

Robert W. Murphy, Poughkeepsie, N. Y., assignor to International Business Machines Corporation, New York, N. Y., a corporation of New York Application June 25, 1958, Serial No. 744,554
6 Claims. (Cl. 40—52)

This invention relates to display apparatus of the so-called monogram sign type for displaying characters, numerals, etc.; and more particularly, to an improved monogram display device utilizing electro-magnetic principles.

The term monogram sign encompasses display apparatus of known types utilizing an assembly of gas filled tubes, an assembly of incandescent lamps, mechanically actuated vanes and so forth, which tubes, lamps, vanes, etc., can be selectively activated, energized or positioned as the case may be, to form letters, numerals and similar symbols.

It is accordingly an object of the invention to provide an improved display device which utilizes electro-magnetic principles.

It is another object of the invention to provide an improved magnetic display device which provides a selectable display of desired characters and has low power requirements.

It is another object of the invention to provide an improved display device having a display face area comprised of a plurality of magnetizable segments, the segments being selectively magnetized and subsequently dusted with a magnetizable powder to provide a visual display of the character represented by the combination of segments magnetized.

Another object is to provide an improved magnetic display device as in the immediately preceding object wherein an electro-magnet is associated with each of said segments for selectively magnetizing the segment.

Another object of the invention is to provide an improved magnetic display device as in the immediately preceding object wherein part or all of the magnetic circuit comprised of each face segment and its controlling electro-magnet is formed of a magnetizable material of high retentivity and wherein the electro-magnetic need only be pulsed to set up a display character, the magnetic display being retained without power as long as desired, the electro-magnets being properly pulsed to demagnetize the permanent magnetic material when erasing of the displayed character is desired.

Still another object of the invention is to provide an improved magnetic display device having a magnetizable face plate which is divided into a plurality of magnetically distinct areas and having a magnetizable core member extending from a rearward face of each face segment to a common magnetizable backing plate, coil means being inductively associated with each core so that by selectively energizing the coils of desired ones of said cores, the associated face segments assume a common magnetic polarity with the adjacent segments of the cores not activated assuming the reverse magnetic polarity, magnetic flux concentrating in the gap areas between the differently polarized segments, and wherein by applying a magnetizable powder to said face plate, said powder concentrates in said high flux gap areas and visually outlines a desired display character.

Other objects of the invention will be pointed out in the following description and claims and illustrated in the accompanying drawings, which disclose, by way of example, the principle of the invention and the best mode, which has been contemplated, of applying that principle.

Figure 6A:
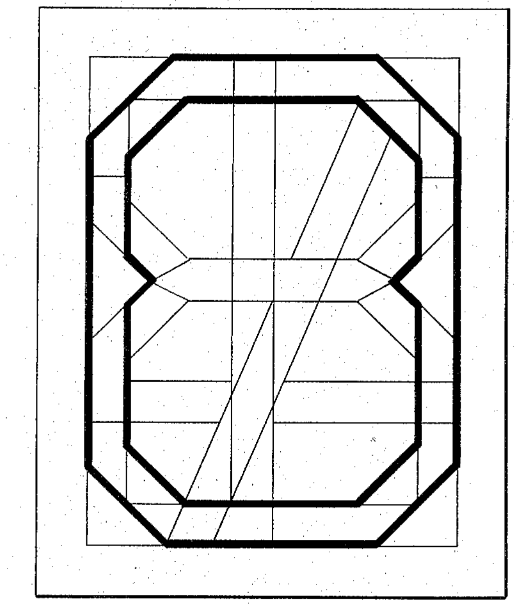
Figure 6B:
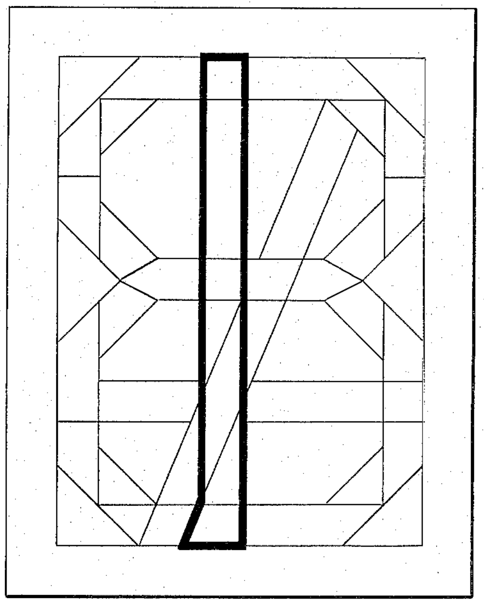
Figure 6C:
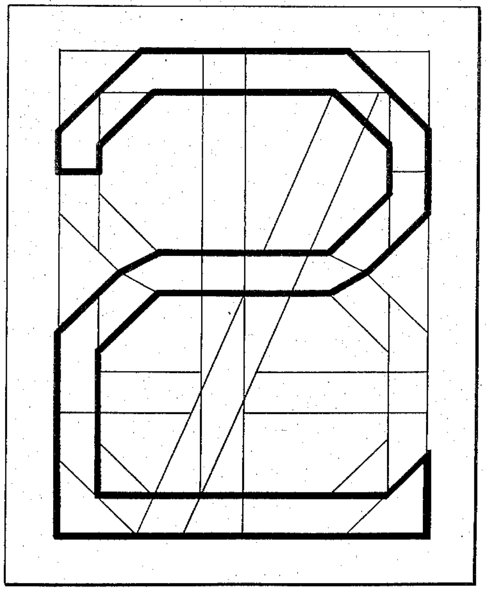
Figure 6D:
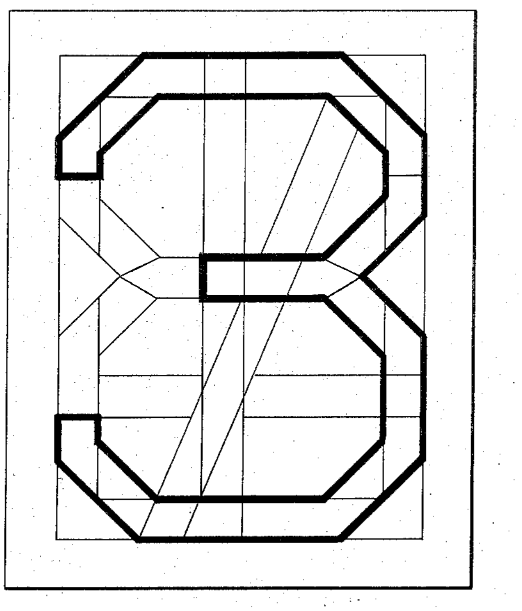
Figure 6E:
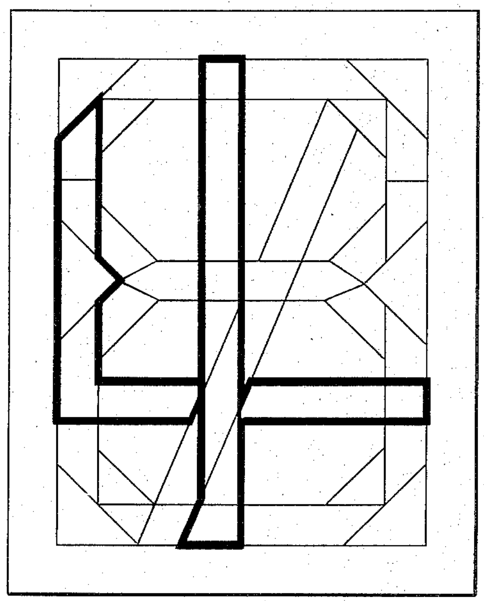
Figure 6F:
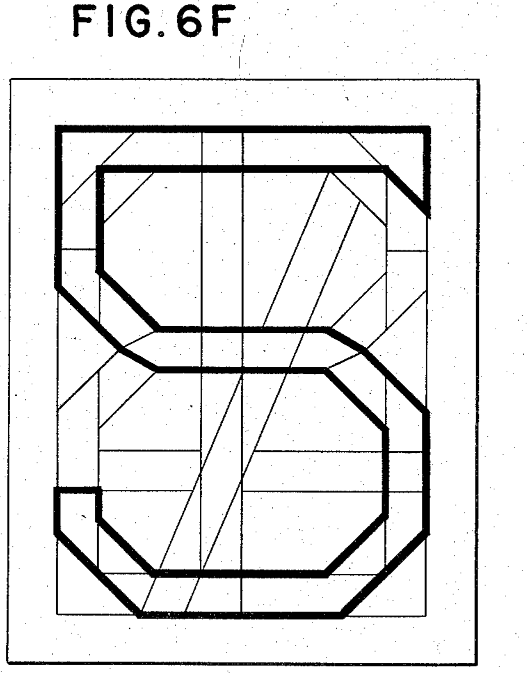
Figure 6G:
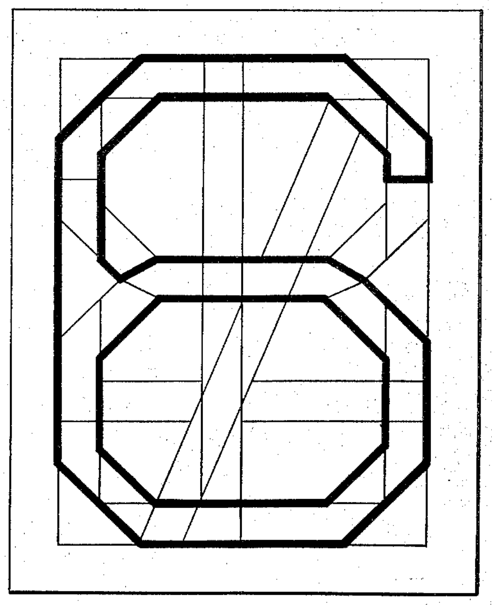
Figure 6H:
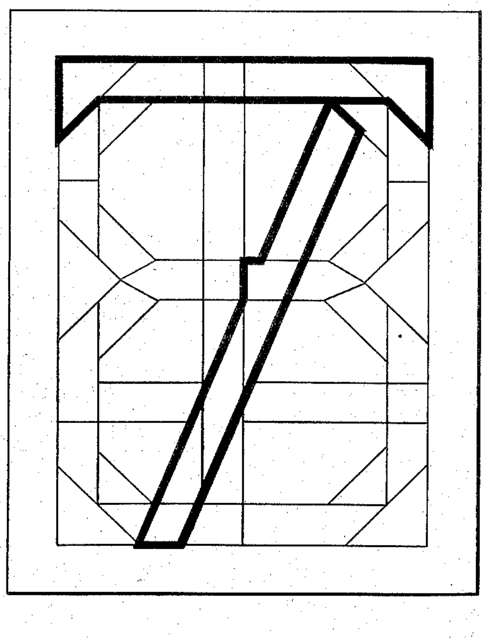
Figure 6I:
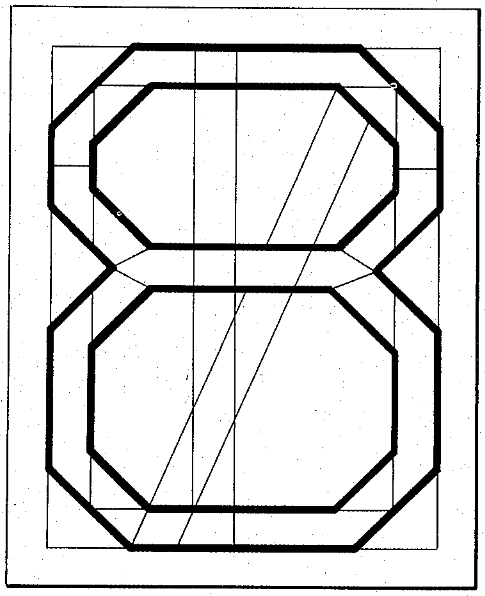

Figs. 6A, B, C, D, E, F, G, H, I, J are diagrammatic representations of all the possible numeral display states 0 through 9, respectively, of a display unit.

Figure 1:
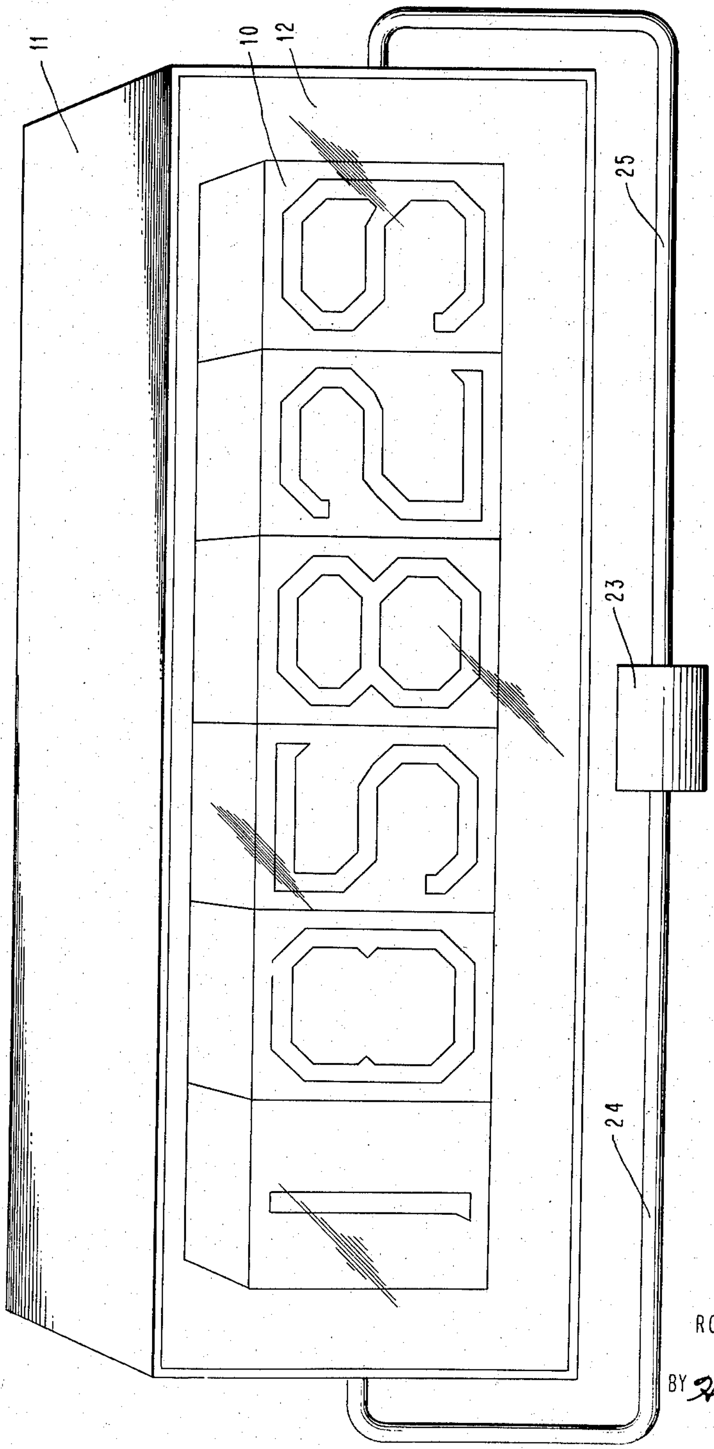
Fig. 1 is a projection view of the magnetic display device, the device being shown with a representative six character position, each character position being an individual display unit adapted to display any selected one of the numerals 0 through 9.

Referring now to Fig. 1, the improved display apparatus comprises a series of individual display units 10 arranged side by side in a rectangular enclosure 11, the enclosure 11 having a glass or plastic front 12, so that the faces of each of the display units may be observed. In Fig. 1 there are shown six of the display units which are adapted to display, respectively, preceding from the left to the right in Fig. 1, the hundred thousands, ten thousands, the thousands, hundreds, tens, and units orders of desired 6 digit numbers. As many individual display units 10 could be provided as required for the maximum number of orders of the values to be displayed. Each of the display units is adapted to display any one of the decimal numerals 0 through 9. The display system, with simple modification that would be evident to one versed in the art, could be applied to any number system such as octal, etc.

Figures 2, 3:
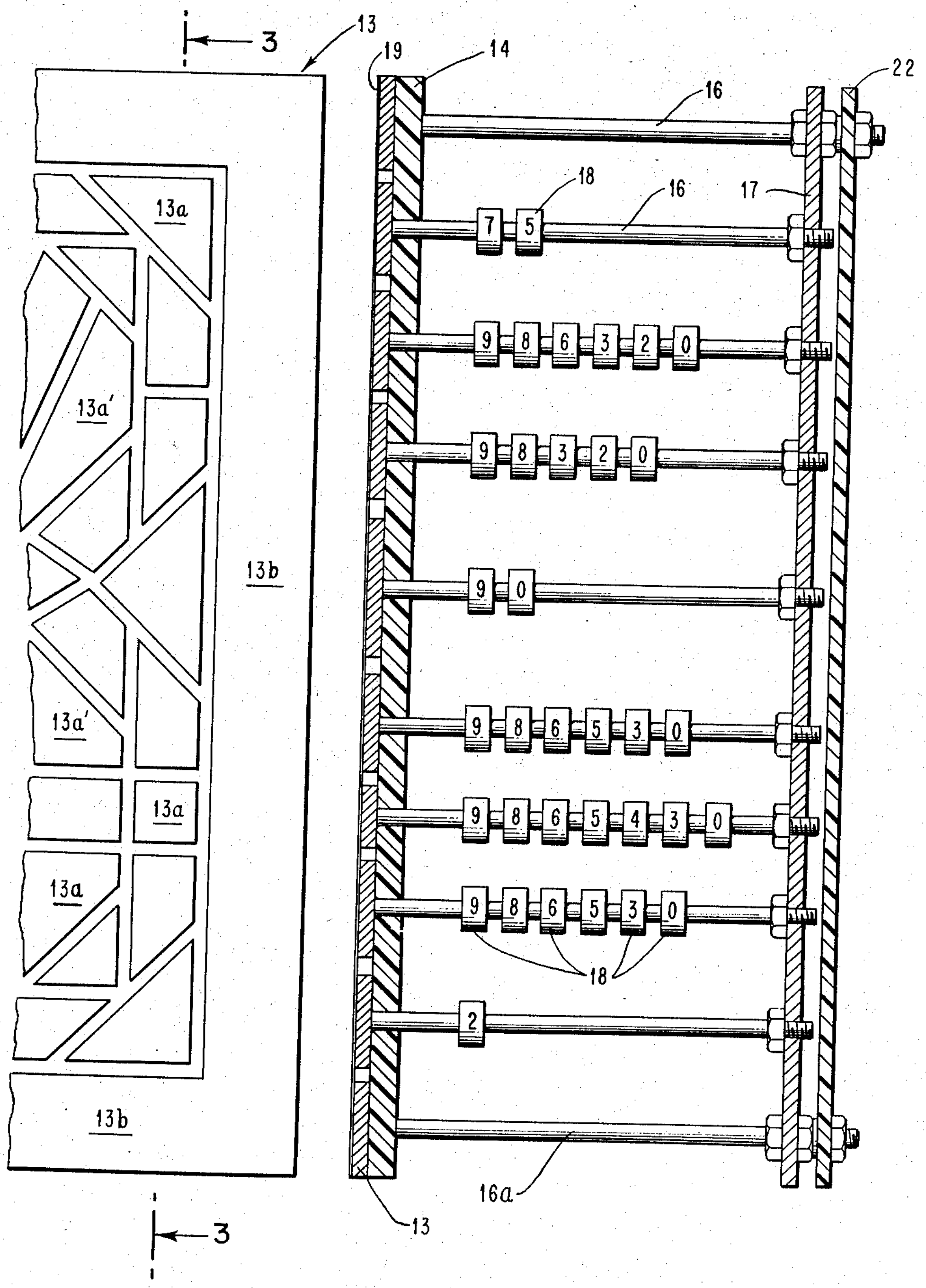
Fig. 2 is a partial front elevation of one of the character position display units of Fig. 1, an opaque sheet member which normally covers the face of the unit being removed to show the details of a segmented magnetizable matrix face plate.
Fig. 3 is a diagrammatic section view taken through a display unit on the plane of the line 3—3 of Fig. 2, the opaque face sheet member being shown in position.

Referring now to Figs. 2 and 3, each of the display units 10 comprises a matrix like member generally designated 13 which is comprised of a plurality of segmented areas 13*a* as indicated. Each of the segmented areas 13*a* which is actually a pole piece, is made of a suitable magnetizable material. If made of steel, the matrix face plate 13 may be constructed by bandsawing the segments or pole pieces from a plate of material, or by slotting through the plate on a milling machine. Each pole piece 13*a* is arranged on a suitable non-magnetic supporting plate 14 so as to maintain it spaced from the adjacent segmented areas. If the matrix member is constructed by bandsawing the segments from a plate, the saw kerf can be utilized as the clearance between adjacent segment areas. It will be noted in Fig. 2 that the matrix 13 has a continuous border area 13*b* thereabout. This border area may actually be cut in sections if desired in the preparation of the other pole pieces from a sheet of material, but it is rearranged as a continuous border on the supporting plate 14 as indicated.

Referring now to Fig. 3 it will be noted that there is provided for each of the pole pieces 13*a*, an elongated core member 16 which has one end extending through the supporting plate 14 and intimately engaged with the rear of the related pole piece 13*a*. A rearward end of each of the core members is secured to a common backing plate 17 which is also formed of a magnetizable material such as steel or the like. A number of core members 16*a* extend between the magnetically continuous border area 13*b* of the matrix 13 and the backing plate 17.

Figure 4:
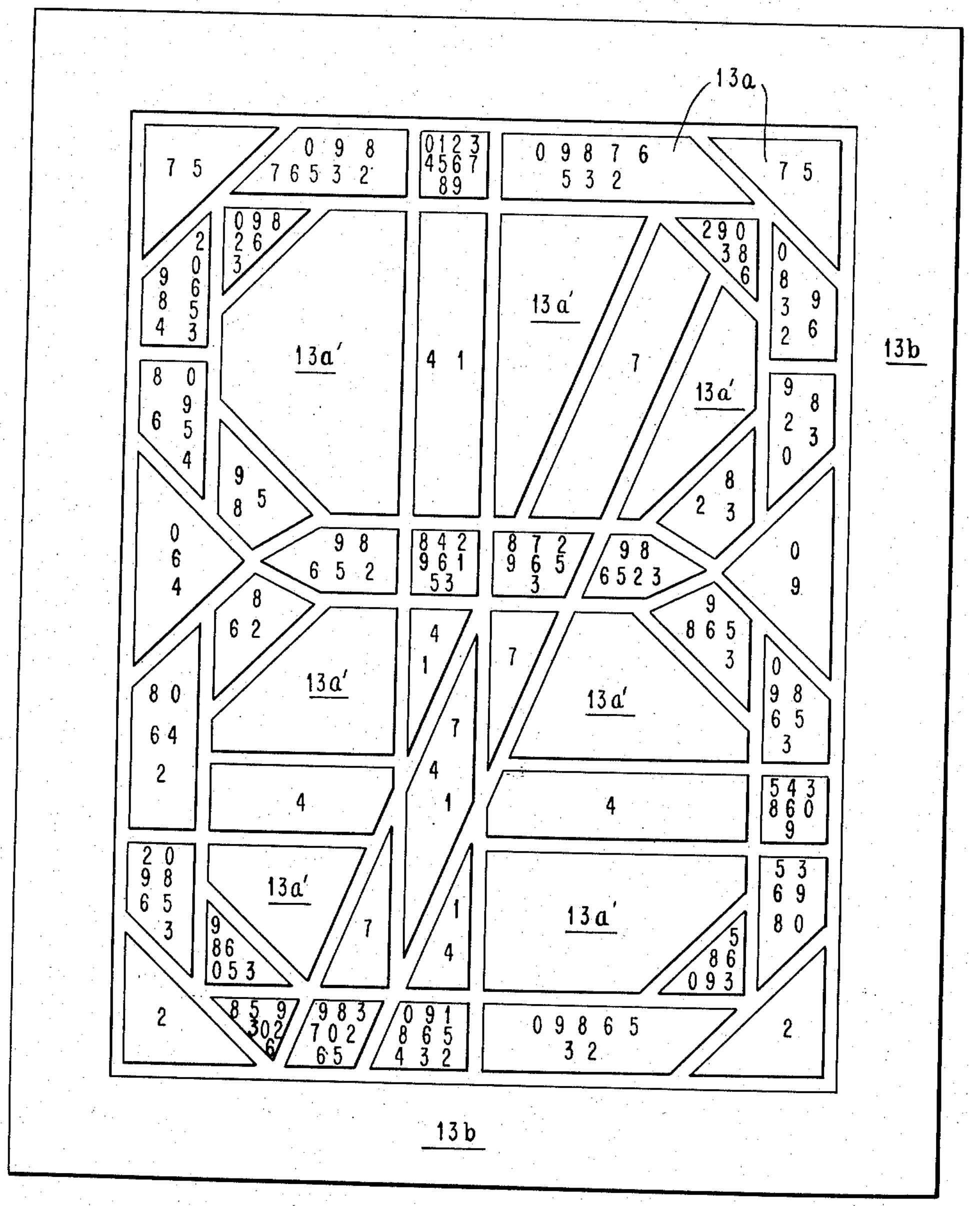
Fig. 4 is a diagrammatical front elevation view of a display unit of Fig. 1, with a part being removed to facilitate a showing of the segmented magnetizable face plate of the display unit, the number or numbers on each segment diagrammatically designating which one or ones of the ten possible display numerals 0 through 9 for which that particular segmented area is positively utilized.

Inductively associated with each of the core members 16 except as hereinafter stated, are one or more energizing windings 18. The above exception is that seven of the core members 16 have no windings thereon and the associated segments 13*a* are accordingly labeled in Fig. 4 as 13*a'* to differentiate these segments from the segments 13*a* having windings on their related cores. The number of windings 18 on each core 16 corresponds directly to the number of the possible numerals 0 through 9 that any particular segment is directly associated with in effecting a display of the related numerals. This relationship is diagrammatically represented in Fig. 4 by the numeral designations from 0 to 9 in the various segments as shown in Fig. 4. Thus in Fig. 4 all of the segments 13*a* having the number 1 therein are utilized in a positive manner, as will be later evident, in the display of the numeral 1 and accordingly have a related "1" energizing winding 18 inductively with the related core member 16. Similarly, each of the segments having the numbers 2, 3, 4 or so forth have individual "2," "3," and "4" etc. (see Fig. 3) windings thereon. It is thus evident that some of the cores have only one winding, while others may have up to 10 individual windings if as in the latter case, the related segment is utilized in the display of all ten numerals 0 through 9.

Figure 5:
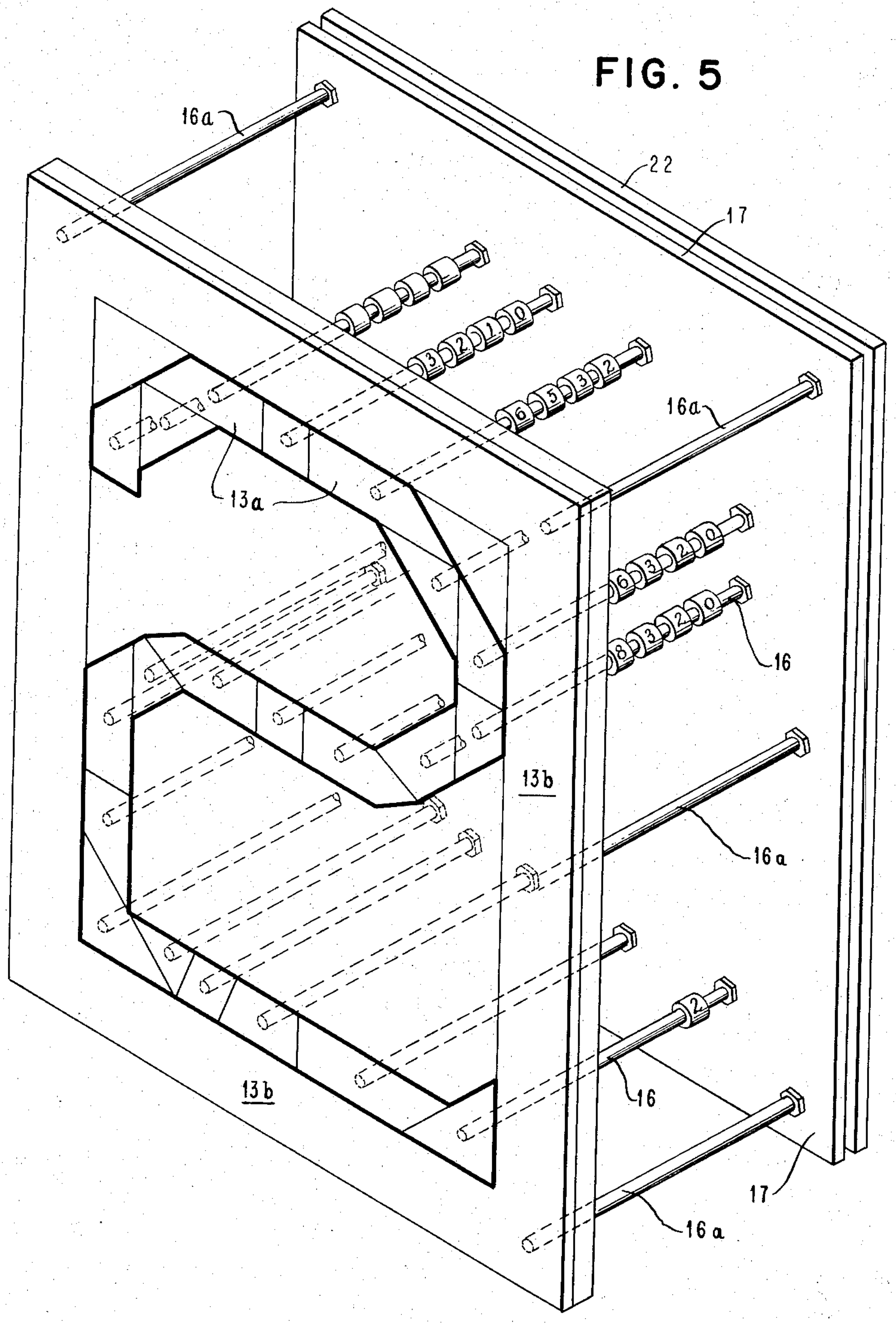
Fig. 5 is a diagrammatic projection view of one of the display units, with various parts being removed to better illustrate the details of the construction of the unit, the unit being shown in its numeric "2" representative display state.

Referring now to Fig. 5 there is diagrammatically illustrated the various face segments 13*a*, their related cores 16 and associated "2" windings, as utilized in effecting a display of the numeral "2." All of the "2" windings may have one end grounded (not indicated) with the other end connected to a common "2" bus (not shown) the bus, in turn, being connectable through any suitable switch (not shown) to the positive side of a suitable potential source (not shown), the other terminal of the source being grounded. The "2" bus and similar numeral buses for the other display numerals, are actually carried on the rearward surface of a terminal board 22 which is formed of a non-conductive material and secured to the backing plate 17 in any suitable manner. The board 22 carries suitable terminals (not shown) by which each of the numeral buses, may be connected to its associated controlling switch (not shown).

When a display of the numeral 2, for example, is desired for one of the display units, the related "2" switch is closed manually or by relay control or the like, thus applying an energizing current from the associated source through the "2" bus to the related "2" windings. Although the "2" windings are described above as being connected in parallel to the related "2" bus (not shown) they could be connected in series if desired. The energizing current produces a magnetomotive force in the associated "2" windings which are appropriately poled so that a magnetic flux is generated in the associated cores in a direction so that the corresponding face segment areas 13*a* all assume a specific magnetic polarity, for example, north, while the rearward end of the "2" cores assume the opposite magnetic polarity, in this example, south. The magnetic south pole polarity of the rearward end of the cores extends through a path comprised of the backing plate 17, through the cores 16 of all the cores not having an energized "2" winding 18 thereon to render all of the associated face segments 13*a* of a south pole polarity. Since the magnetic flux seeks the lowest reluctance path, the flux path is actually through the cores immediately adjacent each winding actuated core. It is thus evident that there is a heavy flux concentration in the spaces between the north polarity face segments and their immediately adjacent south polarity face segments, this flux concentration being, for our particular example, in a pattern defining a numeral 2.

Thus in effecting a numeral "2" display, the complete magnetic circuit includes not only those positively actuated cores and related face segments indicated in Fig. 5 but also the backing plate 17, the immediately adjacent cores of the total array and their associated pole face segments, which are oppositely polarized, and of course, the air gap between the oppositely polarized face segments. The magnetizable backing plate 17 which provides a common low reluctance path, is not actually a necessity and may be eliminated if desired. With the plate 17 eliminated, however, appreciably larger currents must be applied to the windings to effect equivalent display by reason of the high reluctance air path at the rearward end of the cores.

Although not shown in Figs. 2, 4 and 5, there is actually an opaque, non-magnetic, thin sheet 19 of suitable material secured to the matrix face plate, as indicated in Fig. 3, to hide the face plate air gap maze from the view of the observers of the display unit. This opaque sheet does not, of course, effect the flux concentration bridging the gaps separating the adjacent oppositely polarized face segments for the particular display numeral "set up."

The magnetically "set up" character is developed, in effect, by applying to the face of the unit, in any suitable manner, a suitable magnetically sensitive material such as powder or particles, the iron particles being attracted to and concentrating on the opaque sheet 19 over the high flux concentration spanning the gaps between unlike polarized segments. Thus as depicted in Fig. 5 for our representative operation, the iron powder outlines the desired display numeral "2." By utilizing contrasting colors for the display face sheet 19 and the iron powder, a very clear optical display is achieved.

Figure 6J:
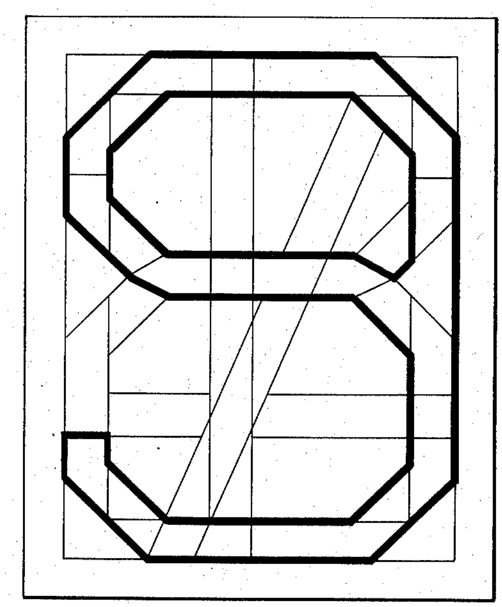

It is thus evident that in order to effect a display of any of the numerals 0, 1, 2, 3, 4, 5, 6, 7, 8 and 9, the appropriate related control circuitry comprised of the parallel or serially connected windings of the cores associated with the proper segment areas, as indicated in Fig. 4, are energized in a similar manner to the previously described numeral 2 operation. This action establishes the desired flux pattern on the matrix face plate, the iron powder then clinging to the opaque sheet 19 at the gaps between adjacent oppositely poled segments, to accordingly outline the desired numeral characters 0 through 9 as indicated, respectively, in the figures (6A through Fig. 6J).

Although the display unit shown is adapted for only numeral display, it is evident that by a proper arrangement of the face plate matrix pattern and the associated cores and activating windings, a display of the letters of the alphabet or any other desired characters could be effected. It will also be evident to one skilled in the art that if desired, the multiple winding arrangement of most of the cores could be simplified to a single winding for each core provided suitable known selecting matrix circuitry is provided to combinationally energize the correct pattern of windings for the display character desired.

In the particular display apparatus as shown in Fig. 1, the minute iron particles or powder are applied to the faces of the six display units indicated to "develop" the display characters "set up" thereon, by a forced circulation of an atmosphere containing minute iron particles through the enclosure 11. The circulation path of the "developing" atmosphere may extend from a suitable pump 23, through tube 24 into the enclosure 11, and then from the enclosure 11 through a connecting tube 25 back to the pump 23. A suitable individual air tight cover member extends over all areas of each display unit except the actual face display area, to prevent any collection of iron particles within the individual display units.

It will be appreciated that the method of applying the iron powder to the faces of the display units by a magnetizable particle laden circulating atmosphere as described, is only representative and the powder may be applied in other obvious ways, such as tossing the powder in front of the matrix face plates by means of an agitator, discharging the powder downwardly over the face plates in any suitable manner, simply lowering the matrix faces onto a layer of powder, etc.

One form of the display device uses soft iron (low remanence) for the core members 16 of the multitude of magnetic paths. In this type of arrangement by reason of the "temporary" magnetic characteristics of the device, the activating current must be continuously applied to the selected pattern of core windings to maintain a display of the desired numeral. In this type of a display, with the removal of the activating current, the resultant collapse of the magnetic flux permits the iron powder to drop from the face of the display thus "erasing" the display character.

In an alternate arrangement some part (such as the core, or face) or all of the magnetic circuit of the display unit is made of a high remanent or "permanently" magnetizable material. In this latter type of arrangement, the desired group of core windings for a desired numeral display need only be momentarily pulsed to "set up" the flux pattern for the desired character, and this pattern will be retained subsequent to the "set up" current pulse. In this latter arrangement alternating current may be applied to demagnetize the face segments between successive display character operations.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A magnetic display device comprising, in combination, a plurality of magnetizable pole pieces, means for supporting said pole pieces in a predetermined matrix pattern with uniform air gaps between each pole piece and the adjacent pole pieces, the air gaps of said pole pieces forming a predetermining matrix pattern with particular portions of said pattern being of a form to represent a related display indicia, individual magnetic core means associated with each said pole pieces and intimately engaged therewith to form a continuous magnetic path with the related pole piece, a common magnetic circuit means intimately engaged with all said core means at a point distinct from the engagement of said cores with mid-related pole pieces, energizing winding means inductively associated with each said core means, means for selectively energizing the windings of desired ones of said cores to similarly polarize the related pole pieces, the adjacent pole pieces assuming the alternate magnetic polarity by their magnetic continuity through their associated cores and said common magnetic circuit means, a thin non-magnetic sheet member overlying all said pole pieces, and means for applying a magnetizable material to said non-magnetic sheet member, the material concentrating over the gaps separating the oppositely polarized pole pieces to give an optical display of said gaps which are representative of the desired display indicia.

2. A magnetic display device as in claim 1 further characterized by the fact that any part of the magnetic paths comprised of each pole piece, its associated core, and said common magnetic circuit means, is formed of a magnetic material having a high magnetic remanence, with said selected windings being only momentarily energized to establish the flux concentration in desired gaps representative of a related desired display indicia.

3. A magnetic display device for selectively displaying any desired one of a plurality of possible display indicia, comprising, in combination, an array of magnetizable segments arranged in a predetermined matrix pattern, the edges of each segment being spaced from its adjacent segments by a uniform air gap, individual elongated core members for each of said segments, one end of each core intimately engaging the back of a related one of said segments to form a magnetic continuous circuit therewith, a magnetizable backing plate intimately engaged by the other end of all said core members to form a magnetic continuous circuit therewith, a plurality of electrical circuits, one for each of the possible indicia that may be displayed by the display device, each said circuit including windings inductively associated with a particular pattern of said cores in accordance with the configuration of the related display indicia, means for selectively energizing a desired one of said circuits with the associated windings through the related cores similarly magnetically polarizing the associated ones of said segments, the adjacent segments assuming an alternate magnetic polarity by reason of the magnetic continuity of the display device cores, there being a flux concentration across the air gaps of adjacent dissimilarly poled segments, said concentrated flux magnetically outlying the desired display indicia, a thin non-magnetic sheet overlying said array, and means for applying magnetizable particles to said opaque sheet, said particles concentrating over said gap flux areas, said opaque sheet and particles being visually contrasting.

4. A magnetic display device comprising, in combination, a magnetizable face plate having a plurality of magnetically distinct shaped segment areas, a magnetizable backing plate, a plurality of elongated magnetic core members, extending between said plates, there being one core member for each said segment areas, one end for each core intimately engaging the backing plate and another end intimately engaging the rear surface of the associated segmented area of said face plate, individual magnetizing coil means inductively associated with predetermined ones of said core members, means for selectively energizing the coils of desired ones of said cores to similarly polarize the associated segment areas in accordance with a desired character to be displayed, and means for dusting a magnetizable powder over said face plate, the powder concentrating in the gap areas linking said similarly actively polarized segments and the immediately adjacent segment areas.

5. A magnetic display device for selectively displaying any desired ones of a plurality of display indicia, comprising, in combination, an array of magnetizable shaped segments including means for supporting said segments in a predetermined matrix pattern with the edges of each segment being spaced from its adjacent segments by a uniform air gap, individual elongated core members for each said segments, one end of each core being intimately engaged with the back of a related one of said segments to form a magnetic continuous path therewith, a plurality of electrical circuits, one for each of the possible indicia that may be displayed by the display device, each said circuits including windings inductively associated with a particular pattern of said cores in accordance with the configuration of the related display indicia, means for selectively energizing a desired one of said circuits with the associated windings through the related cores similarly magnetically polarizing the associated ones of said segments, the adjacent segments assuming an alternate magnetic polarity, there being a flux concentration across the air gaps of adjacent dissimilarly poled segments, said concentrated flux magnetically outlining the desired display indicia, a non-magnetic sheet overlying said array, and means for applying magnetizable particles to said sheet, said particles concentrating on said gaps having the concentrated magnetic flux therein to form a visual display of the desired indicia.

6. A magnetic display device for selectively displaying any desired one of a plurality of possible display indicia, comprising, in combination, an array of shaped magnetizable segments arranged in a predetermined matrix pattern, the edges of each segment being spaced from its adjacent segments by a uniform air gap, a magnetizable backing plate supported spaced from said array of segments, individual magnetizable core members extending between each of said segments to said backing plate, winding means inductively associated with predetermined ones of said segment cores, each core winding means being of a number of individual distinct windings corresponding directly to the number of said possible display indicia the related segment are directly utilized for a display thereof, a number of distinct circuit means, one of each of said possible display indicia, each said circuit means electrically connecting related individual distinct windings on the cores associated with the segments to be directly utilized in the related indicia display, means for selectively engaging a desired one of said circuit means, said energization through the related core winding directly polarizing the related segments in a similar magnetic polarity direction, and indirectly polarizing the immediately adjacent segment areas in the alternate magnetic polarity direction by reason of the magnetic continuity of the display device cores, there being a flux concentration spanning the gaps of adjacent dissimilarly poled segments, a thin non-magnetic sheet overlying said array, and means for applying magnetizable particles to said opaque sheet to outline there on said gap areas having said concentrated flux therethrough.

No references cited.